March 19, 1968

J. H. CYPHER 3,374,077

METHOD OF PRESS BENDING GLASS SHEETS BETWEEN
COLD OPPOSED SHAPING MOLDS

Filed Nov. 18, 1964

INVENTOR
JAMES H. CYPHER

BY Chisholm and Spencer

ATTORNEYS

United States Patent Office 3,374,077
Patented Mar. 19, 1968

3,374,077
METHOD OF PRESS BENDING GLASS SHEETS BETWEEN COLD OPPOSED SHAPING MOLDS
James H. Cypher, New Kensington, Pa., assignor to Pittsburgh Plate Glass Company, Pittsburgh, Pa., a corporation of Pennsylvania
Filed Nov. 18, 1964, Ser. No. 412,083
3 Claims. (Cl. 65—104)

ABSTRACT OF THE DISCLOSURE

Press bending a glass sheet by sandwiching a heat-softened sheet between relatively cool, relatively massive complementary shaping members to bend the sheet to its desired shape and maintaining the shaping members in contact with the bent glass sheet for sufficient additional time to cool the glass surfaces to a temperature at which the surfaces remain stiff enough to resist deformation of the shaped sheet during its transfer to a cooling zone, but insufficient time to lower the interior temperature of the glass to below the strain point.

---

Figure 1:
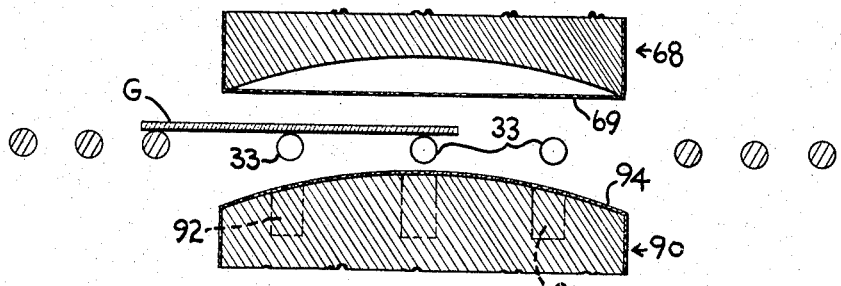
Figure 2:
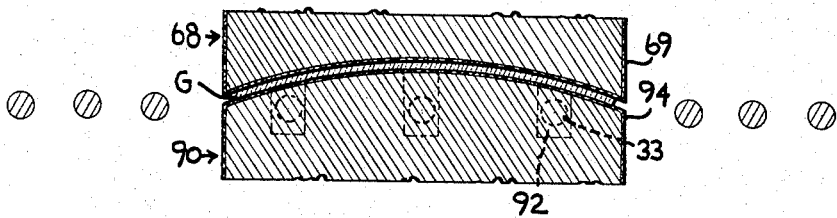

This invention relates to press bending glass sheets, particularly to an improved method for assuring that relatively thin glass sheets, i.e., those having a nominal thickness of less than ¼-inch, are bent to shapes within very close tolerances.

The glass sheet bending art has developed a technique of bending glass sheets to produce curved glass sheets by a process known as press bending. According to this method, glass sheets are heated to the vicinity of the glass softening point (for example, between 1200 degrees Fahrenheight and 1250 degrees Fahrenheit in the case of soda-lime silica glass of the type normally found in plate glass, sheet glass, and float glass compositions). The glass sheets, while sufficiently hot for shaping, are then sandwiched in pressurized contact between shaping members having complementary shaping surfaces to impress the shape of the shaping members on the heat-softened glass. The shaping members are retracted and the bent glass sheets rapidly cooled by moving the bent sheets past a plurality of cold air blasts.

A heat-softened glass sheet shaped in the above manner as taught by the prior art changes in configuration during the time the glass is transported between the shaping station and the cooling station following the completion of the pressing operation. Accordingly it has been proposed to have orifices through the shaping surfaces of the glass shaping members to chill the glass surfaces prior to transporting the glass to a region where cooling is completed. Such cooling fluid, such as air, causes the glass to be cooled nonuniformly and produces iridescent patterns in the glass surface.

Another method commonly employed is to press bend the glass to a sharper curvature than that ultimately required and to depend upon distortion to produce the ultimate configuration. This distortion occurs from the time the glass is released from pressurized engagement until the time it is cooled to below a temperature at which further deformation can take place and the temperatures of the opposite surfaces are equalized. Such latter technique is more difficult to accomplish than bending the glass initially to its ultimate shape because it is easier to avoid distortion altogether than to control its extent.

It is an object of the present invention to shape the glass initially to its ultimate shape and to cool the glass surfaces uniformly and substantially equally by a novel technique before transferring the bent glass from the shaping station. The novel technique presently proposed stiffens the glass surfaces only for the time when it is transferred from the shaping station to the cooling station.

The object of the present invention is accomplished by employing relatively cold, thermally stable, massive metal shaping members having heat conductive properties to shape the glass to the desired shape and to hold the glass after shaping in pressurized contact for an additional period. A stretchable, knit fiber glass covering is employed between the shaping faces of the shaping members and the glass to protect the glass from direct contact with the metal shaping members. Direct contact causes too steep a temperature gradient through the thickness of the sheet and may chill crack the glass.

Normally, a maximum of two to three seconds of pressurized engagement will conform the shape of a heat-softened glass sheet to the shaping surfaces of the glass shaping members. The present invention retains the glass in pressurized contact with the shaping members for an additional period beyond that needed to shape the glass. In addition, the present invention employs solid, relatively massive shaping members compared to the mass of the glass and having substantially continuous shaping surfaces coextensive with the glass sheet surfaces to provide pressurized engagement throughout substantially the entire glass area. The few seconds of additional holding time cools the glass surface to below its deformation temperature while not reducing the interior glass temperature unduly. Therefore, the glass surfaces become sufficiently stiff to retain the glass shape during the period of transfer to a cooling apparatus.

The holding time should not be extended unduly or the production rate is impaired. The glass should be retained in pressurized engagement between the shaping members only a sufficient time to insure that the glass surfaces remain stiff during the time of transferring the shaped glass sheet from the shaping station to a cooling station where air is imparted at a high velocity through opposed sets of nozzle orifices between which the shaped glass moves. There, the glass is quenched by fluid blasts to steepen the thermal gradient between its interior and its surface, thus "heat strengthening" the glass.

The present invention is especially useful in a so-called horizontal press bending operation where glass sheets are conveyed in a substantially horizontal direction along a sequence of longitudinally spaced conveyor rolls, each extending transversely of a path of glass movement through a heating zone, a shaping zone and a cooling zone, wherein their forward movement is interrupted at said shaping zone to lift the glass from the conveyor and sandwich the sheet in pressurized engagement between relatively cold upper and lower shaping members having solid, substantially continuous, complementary shaping surfaces at least coextensive in area with the surfaces of the glass sheet undergoing treatment.

Each glass sheet, heated to an elevated temperature above that needed for shaping while traversing the heating zone, is shaped to its desired curvature at the shaping station while still in a heat-softened state.

After the shaping step, the shaping members are retracted and the glass moved to the cooling zone as rapidly as possible. At the cooling zone, the bent glass sheets pass between a pair of sets of nozzles that impart air blasts rapidly against the opposite major surfaces of the glass sheets.

In the past, the glass sheet press bending art attempted to perform the shaping step as quickly as possible by limiting the pressurizing step to a maximum of about 2 seconds, the minimum time needed for a pressure of one pound per square inch to conform vertically supported glass sheets ¼-inch thick to the shape of the shaping members.

First attempts at horizontal press bending (wherein the glass is conveyed and supported in a horizontal plane) resulted in a flattening of the glass from the initial shape imposed during the 2 second shaping cycle while transferring the sheet to the cooling zone. Prior to the present invention, the glass was overbent to compensate for the flattening during its transfer to the cooling zone.

Figure 3:
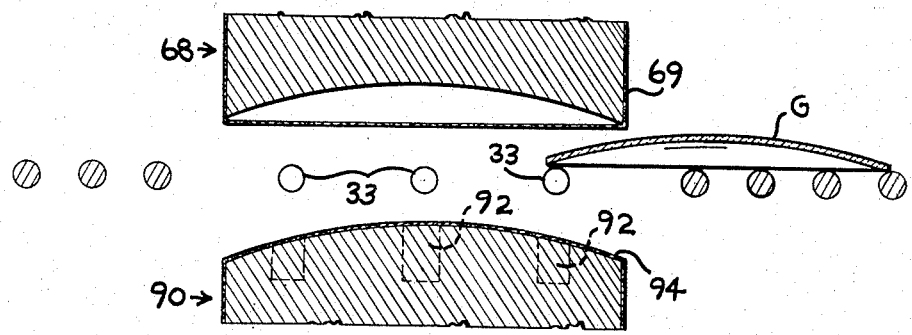

The present invention has determined that distortion is reduced by increasing the hold time or period of pressurized engagement, only sufficiently long to cool the glass surfaces to stiffen the latter temporarily, but not so long to cool the interior or core of the glass to its strain point. If the core remains hot for a sufficient time for the relatively cool and massive shaping members to cool the glass sheet surfaces to a temperature where they are sufficiently stiff to maintain the glass sheet shape but not long enough to cool the glass interior to below the strain point, the lower shaping member 90 is retracted below the level of support provided by the stub rolls and the glass sheet is conveyed rapidly to the cooling zone as shown in FIG. 3.

Considerable difficulty possible and merely be sufficiently large to provide clearance for the lower shaping member to pass through the stub rolls. Thus, the apparatus provides maximum possible area for heat exchange between the relatively massive, relatively cool, glass shaping members and the opposite surfaces of the glass sheet.

While the invention has been described in an operation involving a horizontal press bending operation, wherein the glass is supported horizontally, it is also effective in situations where the glass is supported in any plane including a vertical plane. The gist of the present invention resides in maintaining a pair of continuous, massive, relatively cold glass shaping members in pressurized contact with the opposite surfaces of the glass sheet after the time needed to shape the glass has expired to cool and harden the surfaces temporarily for a period substantially equal to the time needed to transfer the glass from the shaping zone to the cooling zone.

For apparatus in operation at assignee's plant, an additional 4 to 6 seconds holding time after shaping was found desirable to prevent glass sheets $\frac{1}{8}$-inch thick from distorting, while 6 to 10 seconds additional holding time after shaping kept glass sheets $\frac{3}{16}$-inch thick from distortion.

In operations at the plant, the temperature of the shaping members stabilized at a range of between about 400 degrees Fahrenheit and 450 degrees Fahrenheit for such operations. This enabled the shaping members to produce a cooling effect on the glass because of almost 800 degrees Fahrenheit temperature difference between the glass and the shaping members at the onset of pressurized engagement.

The form of the present invention shown and described herein represents illustrative preferred embodiments thereof. Various changes may be made without departing from the spirit of the invention as defined by the claimed subject matter that follows.

What is claimed is:

1. A method of shaping glass sheets comprising conveying a plurality of glass sheets in a horizontal direction in direct sequential contact with successive conveyor elements spaced longitudinally of and extending transversely of a path of glass movement in a substantially horizontal plane to provide a path through a heating zone, a shaping zone and a cooling zone spaced sequentially from one another along said path, wherein after each sheet is heated to a temperature sufficient for deformation, the forward movement of each sheet is interrupted at said shaping station for shaping the glass by pressurized contact between a pair of relatively cool upper and lower glass shaping members disposed above and below said conveyor elements, respectively, the improvement comprising holding said heated, bent glass sheet in pressurized engagement between said upper and lower shaping members, kept at a temperature range sufficiently below the strain point of glass to cool said heated glass sheet on contact therewith after shaping said sheet, for a period only of sufficient duration to cool the glass surfaces to a temperature at which the surfaces become sufficiently hard to a depth sufficient to retain said sheet rigid enough to resist deformation during its transfer to said cooling zone while the interior temperature of the glass is retained sufficiently above the strain point to permit the sheet to develop a temper on rapid cooling, and then rapidly cooling said sheet at said cooling zone to impose a temper in said sheet.

2. A method as in claim 1, wherein said period lasts between approximately 4 seconds and approximately 10 seconds.

3. A method as in claim 1, wherein said glass sheet has its central portion bowed upward relative to its edge portions during said shaping.

References Cited

UNITED STATES PATENTS 3,223,504 12/1965 Cypher et al. _____ 65—106
1,134,200 4/1915 Heupel _____ 65—306 X DONALL H. SLYVESTER, *Primary Examiner.*

A. D. KELLOGG, *Assistant Examiner.*